Jan. 13, 1948.  H. N. FAIRBANKS  2,434,355
AUTOMATIC LOOP REPLENISHER
Filed Sept. 24, 1945

Inventor
Henry N. Fairbanks
Baldwin & Cantlebury
Attys.

Patented Jan. 13, 1948

2,434,355

UNITED STATES PATENT OFFICE 2,434,355

AUTOMATIC LOOP REPLENISHER

Henry N. Fairbanks, Beverly Hills, Calif., assignor to Mitchell Camera Corporation, West Hollywood, Calif., a corporation of Delaware Application September 24, 1945, Serial No. 618,163

4 Claims. (Cl. 88—18.4)

1

The general object and purpose of this invention is to provide for the replacement of the lower so-called loop in a kinetograph mechanism when that loop has been lost because of failure of the intermittent movement to move the film toward the feed sprocket which takes up the film from the movement.

Loss of the lower loop may be caused by incorrect initial threading of the film through the movement, or caused by torn or otherwise damaged perforations. That is more apt to occur in motion picture projectors than in cameras; and accordingly the invention has a wider range of utility in projectors than in cameras or other similar kinetograph mechanisms. However, the invention is generally applicable to any kinetograph mechanism wherein the film is moved by an intermittent movement mechanism and passes to a take-up device, such as the usual lower feed sprocket, from the intermittent movement. The lower loop must be maintained between the intermittent movement and the take-up device in order that the intermittent movement may operate properly.

Figure 1:
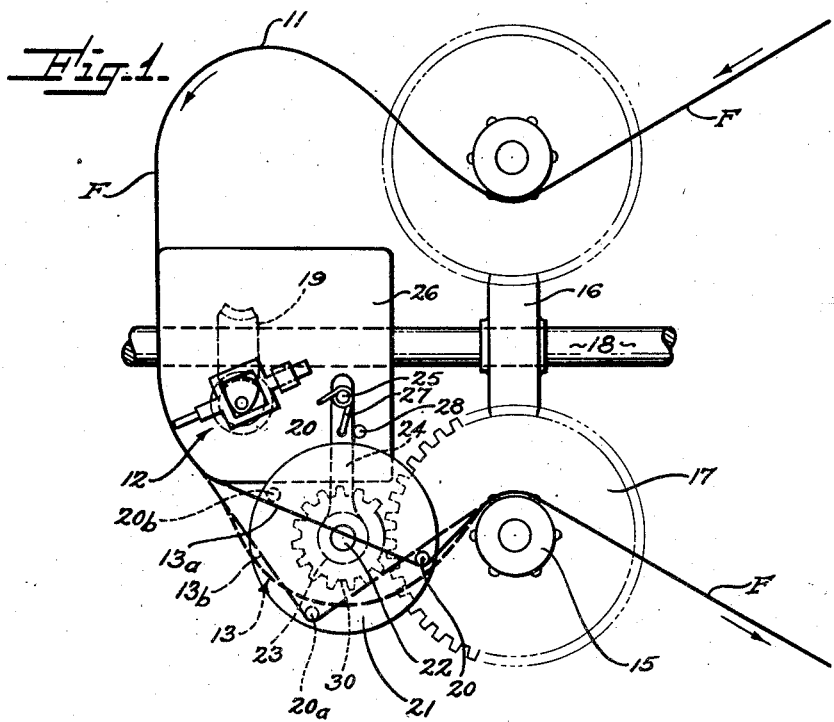
Figure 2:
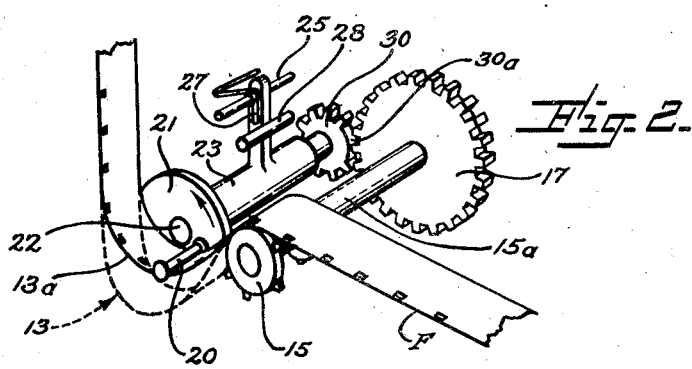

The nature of the invention will be best understood from the following specific and detailed description of a present preferred and illustrative form which is shown in the accompanying drawings in which, Fig. 1 is a diagrammatic elevation showing the loop replenisher applied to a typical kinetograph movement, and Fig. 2 is a diagrammatic perspective illustrative of the same.

As shown in the diagram of Fig. 1 the film F is drawn from a supply reel (not shown) over an upper feed sprocket 10 which feeds the film continuously into an upper loop 11 above the intermittent movement 12. After passing through the intermittent movement the film forms a loose loop such as is indicated in dash lines in Fig. 1 at 13, between the intermittent movement and the lower or take-up feed sprocket 15. From sprocket 15 the film is drawn to the usual take-up reel or equivalent device (not shown). The feed sprockets 10 and 15 are driven continuously, as by gearing 16, 17 from drive shaft 18. The intermittent movement 12 is commonly driven from that same drive shaft, and is here indicated as being so driven by the gearing 19, 20.

If a film perforation or perforations become damaged or torn the intermittent movement, which depends for its operation on engagement with the film perforations, will fail to move the film until the film is by some other means moved into a position where the intermittent movement can engage an undamaged perforation. Usually, unless damage to the film extends to more than one perforation, a forward shifting of the film in the intermittent movement sufficient to bring the next perforation into engageable position will suffice to renew the proper intermittent motion of the film.

During each successive dwell of the film the lower loop 13 is temporarily shortened by the constant withdrawal of film from the loop by lower sprocket 15. If the intermittent mechanism fails to move the film after a period of dwell, the lower sprocket continues to draw film from the lower loop, and unless the lower loop is immediately replenished, withdrawal of film by the lower sprocket will continue until the film is pulled taut between that sprocket and the raceway of the intermittent mechanism. That may result in the film being pulled through the raceway until the intermittent mechanism engages a good film perforation; but the most likely result is to rupture the film between the take-up sprocket and the intermittent mechanism, or to strip out the film perforations at the sprocket or in the intermittent mechanism.

The device which is shown in the accompanying drawings acts automatically to replenish the lower loop and draw the film through the intermittent mechanism as soon as the lower loop has been shortened to a dangerous length.

In Figs. 1 and 2 a normal lower loop is shown at 13. This normal loop passes loosely below, or outside of, a crank pin 20 which is mounted on a crank throw preferably in the form of a disk 21. Crank disk 21 is carried on the end of a shaft 22 mounted in a bearing 23 which may be fixedly mounted in the mechanism but is preferably yieldingly supported for reasons which will appear. As shown in the drawings, bearing 23 is suspended by an arm 24 from a pivot pin 25 which may be fixedly mounted in the mechanism in any suitable manner, as for instance by being mounted on the mounting plate 26 of the intermittent mechanism. A spring 27 acts to swing arm 24 and shaft 22 toward the right in Fig. 1 and a stop pin 28 limits that movement. On the end of shaft 24 opposite crank disk 21 a mutilated gear 30 is engageable with a gear which is in constant rotation when the kinetograph is operating. That gear may conveniently be the gear 17 through which sprocket 15 is driven. In the particular gear train which is shown here, gear 17 is one of a pair of spiral gears; but it can be meshed in the manner of a spur gear by the mutilated gear 30.

In the normal and inactive position of the parts, the recessed and toothless portion 30a of mutilated gear 30 stands in the position shown in the drawings relative to driving gear 17. Stop 28 is so placed that the recessed portion of gear 30 cannot be pressed into frictional engagement with driving gear 17; but in that position of the mutilated gear its teeth will engage the teeth of gear 17 if the mutilated gear is initially rotated through a small angle.

When the lower loop 13 shortens to such a length as is shown at 13a it is pulled up more or less tautly under crank pin 20 standing inside the loop in its normal position. A slight further shortening of the loop then moves the crank pin upwardly (in an inward direction with relation to the loop) and thus rotates the mutilated gear 30 through a small angle to engage its teeth with the teeth of gear 17. If the gear teeth do not immediately engage in proper mesh, spring 27 allows mutilated gear 30 to back off until its first teeth registers properly with the teeth of gear 17, when spring 27 immediately moves gear 30 to move the teeth into proper mesh. Gear 17 then immediately drives gear 30, in a counter-clockwise direction in the arrangement here shown, through substantially a complete revolution until gear 30 again reaches the normal position shown in the drawings. To stop gear 30 in that position any suitable frictional drag may be applied, but the friction of the moving parts associated with the gear may usually be sufficient.

In the complete revolution of crank pin 20 it passes to and through such a position as is shown in dotted lines in Fig. 1 at 20a. That position, being below, or outward of, its normal position shown at 20, the pin in its travel above the film engages the film and pulls it through the intermittent mechanism until a loop of the temporary form shown in dash lines at 13b is formed. And then, pin 20 passing on to its normal position leaves the film in its normal loop as shown at 13.

The relative arrangements of all of the parts, and particularly the ratio of gearing 17, 30, are such that the crank pin 20, in its movement from the position shown at 20 toward the position shown at 20a, will engage the shortened film loop 13a at some such position as is indicated at 20b before the film has been pulled to dangerous tautness by sprocket 15 in its constant movement. We may suppose for instance that at the time when the shortened film loop 13a has moved crank pin 20 to engage the gear teeth, there is still, say, more than one frame length of excess film in the loop 13a. In the arrangement shown in the drawings, pin 20 travels through about a half revolution to engage the film at such a point as 20b. Assuming that sprocket 15 has a circumference of six film frames, then if gear 30 has approximately one-third the diameter of gear 17, the crank pin will reach position 20b where it begins to pull the film through the intermittent movement mechanism before the film is drawn fully taut by sprocket 15. Crank pin 20 then in its further movement draws the film out to normal loop length, the radius of throw of the crank pin being sufficient to do that.

It may be remarked that the direction of rotation of the crank is not fundamentally important to the invention; it may rotate clockwise in the drawings and perform its function. In the illustrated mechanism the crank would rotate clockwise in the drawings if, for instance, the film passed under sprocket 15 and the latter rotated counterclockwise. In that event position 20b or thereabouts would be the normal standing position of the crank pin when the mutilated gear stands in its normal non-meshing position. Shortening of the film loop would then move the crank pin up, or inwardly of the loop, to start clockwise rotation for one revolution during which pin 20 would pass through position 20a. The action would thus be fully the same as that first described, except that in the first described action the slight frictional drag of the crank pin on the film tends to pull the film from the raceway of the intermittent movement rather than to pull it in opposition to its movement toward sprocket 15.

The interengagement of gear 17 with the mutilated driving gear 30 does not necessarily have to be through meshing gear teeth, although preferably so. The periphery of mutilated gear 30 can be plain, in which case gear 30 will engage gear 17, or any other suitable driving member, frictionally. The action of such a frictional drive gear is the same as before described.

I claim:

1. In a kinetograph mechanism having an intermittent film moving mechanism and a constantly driven take-up sprocket to which the film normally passes through a loose loop from the intermittent mechanism; a loop replenishing device comprising a crank having a crank pin which stands inside the normal loose loop, a mutilated gear rotatively connected to the crank to drive it, a constantly rotating driving gear with which the mutilated gear is adapted to mesh, the mutilated gear normally standing in a position where its mutilation is adjacent the driving gear and the corresponding normal position of the crank pin being between the extreme inner and outer positions which it passes through in rotation, so that a shortening film loop engaging the crank pin from the outside will move the pin inwardly to mesh the gears.

2. A loop replenishing device as defined in claim 1, and in which the crank and the mutilated gear are carried by a shaft, means for mounting the shaft on an axis at right angles to the plane of the film loop, and yielding means associated with the mounting and allowing movement of the shaft and gear away from the driving gear.

3. A loop replenishing device as defined in claim 1 and in which the mutilated gear is mounted on a shaft which is movable with relation to the driving gear, and yielding means allowing movement of the shaft and gear away from the driving gear.

4. In a kinetograph mechanism having an intermittent film moving mechanism and a constantly driven take-up sprocket to which the film normally passes through a loose loop from the intermittent mechanism; a loop replenishing device comprising a crank having a crank pin which stands inside the normal loose loop in a normal position between the extreme inner and outer positions passed through by the pin in a revolution of the crank, so that the crank pin is moved inwardly by a shortening loop, a constantly rotating driving member, and crank driving means comprising a locally mutilated driving periphery rotatably associated with the crank, said periphery adapted to drivingly engage the rotating driving member when the crank pin is moved inwardly and the mutilated portion normally standing in a position to break that driving engagement.

HENRY N. FAIRBANKS.

REFERENCES CITED

The following references are of record in the file of this patent:

UNITED STATES PATENTS

| Number | Name | Date |
| --- | --- | --- |
| 1,051,632 | Power | Jan. 28, 1913 |
| 2,332,079 | Hoehn | Oct. 19, 1943 |
| 3,371,836 | Masterson | Mar. 20, 1945 |
| 2,407,795 | Nelson | Sept. 17, 1946 |
| 2,418,361 | McNabb | Apr. 1, 1947 |